United States Patent [19]
Capra

[11] 3,931,660
[45] Jan. 13, 1976

[54] SCRUBBING APPARATUS FOR VEHICLE-WASHING STATION

[76] Inventor: Uberto Capra, Alte Ceccato (Vicenza), Italy

[22] Filed: Oct. 2, 1974

[21] Appl. No.: 511,183

[30] Foreign Application Priority Data
Oct. 3, 1973 Italy.................................. 29664/73
Jan. 11, 1974 Italy.................................. 19305/74
Feb. 8, 1974 Italy.................................. 20339/74

[52] U.S. Cl............................ 15/53 AB; 15/DIG. 2
[51] Int. Cl.²......................................... B60S 3/06
[58] Field of Search............. 15/DIG. 2, 21 D, 21 E, 15/53, 53 A, 53 AB

[56] References Cited
UNITED STATES PATENTS

| | | | |
|---|---|---|---|
| 3,618,152 | 11/1971 | Capra.................. | 15/21 E |
| 3,662,419 | 5/1972 | Dini..................... | 15/21 E |
| 3,793,667 | 2/1974 | Capra................... | 15/21 E |

*Primary Examiner*—Edward L. Roberts
*Attorney, Agent, or Firm*—Karl F. Ross; Herbert Dubno

[57] ABSTRACT

A guide structure straddling the path of a vehicle to be washed carries a vertically movable horizontal rotary brush, a pair of laterally displaceable first vertical rotary brushes moving in a first transverse plane perpendicular to that path, a pair of second vertical rotary brushes with shafts tiltably mounted on horizontally swingable main supporting arms pivoted to the structure downstream of the first pair, and a pair of vertical third rotary brushes mounted on horizontally swingable ancillary arms which intersect the main arms and are also pivoted to the structure downstream of the first pair. The first vertical brushes counterrotate in a sense tending to drive them apart on contact with a front surface of the vehicle; the initially separated second vertical brushes counterrotate in the opposite sense, so as to move toward each other, and their bristles interpenetrate in their position of closest approach, with their arms lying in a second transverse plane parallel to the first plane, into which they are urged by the relatively advancing vehicle. Upon the further advance of the front of the vehicle beyond that second plane, the second vertical brushes again separate; this separating movement is assisted by a pair of stationary guide rails, curving along arcs centered on the fulcra of the main arms, which are engaged by friction rollers on the tiltable shafts of the second brushes whenever the latter are deflected from their vertical attitude toward each other. The third brushes, hanging down to a lower level than the first and second brushes, normally rest against the sides of the guide structure and are held in that withdrawn position by interengagement of the main and ancillary arms until the second brushes are displaced from their normal position by the thrust of an oncoming vehicle whereupon the third brushes are free to engage the sides of the vehicle at the level of its wheels and also to sweep part of the vehicular rear surface.

10 Claims, 9 Drawing Figures

SCRUBBING APPARATUS FOR VEHICLE-WASHING STATION

FIELD OF THE INVENTION

My present invention relates to scrubbing apparatus for a vehicle-washing station wherein a vehicle to be washed moves relatively to a guide structure along a straight path straddled by that structure, either the guide structure or the vehicle being stationary.

BACKGROUND OF THE INVENTION

Conventional equipment of this nature comprises a portal frame or a tunnel roof carrying one or more elevatable horizontal rotary brushes for scrubbing the front, top and rear surfaces of the vehicle as well as at least one pair of symmetrically disposed laterally oscillatable rotary vertical brushes for scrubbing front, side and surfaces of respective halves of the vehicle. Such brushes and their mountings have been disclosed, for example, in my U.S. Pat. Nos. 3,618,152, 3,633,231 and 3,725,967.

In such a system the vertical brushes are generally positioned close to each other, near the centerline of an oncoming vehicle, at the beginning of a washing cycle and move apart along the front of the vehicle as the latter advances relatively to the guide structure. Since the forward end of a vehicle is usually dirtier than the rest of its body, this relatively short contact with the vertical brushes may not suffice for a thorough cleaning of the vehicular front surface, especially near its center.

OBJECTS OF THE INVENTION

An important object of my present invention is to provide means in such a station for more effectively scrubbing the front of a passenger car, truck or other vehicle to be washed.

A more specific object is to provide a compact ancillary assembly for the scrubbing of the lower parts of the vehicle body, especially its wheels, without interfering with the operation of the main scrubbing brushes or requiring a lengthening of the guide path for this purpose.

SUMMARY OF THE INVENTION

In accordance with my present invention, the guide structure of a vehicle-washing station including at least one horiziontal brush comprises a pair of first vertical brushes, mounted on the structure for oscillatory movement in a first transverse plane perpendicular to the line of relative vehicular motion, as well as a pair of second vertical brushes suspended from the free ends of a pair of horizontally swingable supporting arms which are symmetrically fulcrumed on the guide structure above the path of the vehicle and have pivotal axes located in a second transverse plane downstream of the first plane as viewed with reference to the apparent (or relative) vehicular motion. The supporting arms are urged into a normal position, offset from the second transverse plane, by suitable biasing means such as spring-loaded or tilted hinges. In this normal position, the brushes of the second pair lie upstream of the second transverse plane and are separated from each other by a distance less than the width of the horizontal brush; yielding to the thrust of the vehicle, these brushes closely approach each other on swinging through the second transverse plane and then separate again. Thus, the brushes of that pair move first toward and then away from each other across the vehicular front surface which is thereby intensely scrubbed; advantageously, the supporting arms are of such length (or are sufficiently extensible) that the bristles of these brushes interpenetrate in their position of closest approach so as not to leave any dead zone escaping the scrubbing action.

If these swingably supported brushes counterrotate in such a sense that their confronting sides (i.e., those facing the centerline of the guide path) move upstream, i.e., against the direction of relative vehicular motion, this rotation will tend to accelerate the symmetrical displacement of the brushes toward each other in the initial phase of contact with the vehicle by a tiltable mounting of the brush shafts on their supporting arms. It is then possible to let these brushes approach each other earlier in the cycle than would otherwise be the case, giving them more time to clean the center of the vehicular front surface.

On the other hand, this mode of operation tends to impede the eventual separation of the brushes necessary to let the vehicle pass betweeen them. For this reason, according to a further feature of the invention, I prefer to provide the guide structure with two arcuate overhead tracks fixedly mounted thereon and centered on the pivotal axes of the supporting arms, each of the tiltable brush shafts carrying a friction roller engageable with the respective tack upon a tilting of the shafts toward each other. By virtue of this engagement, the friction rollers driven by the brush motors coact with the tracks to complete the swing of the arms away from their normal position, in the downstream direction, until their brushes have cleared the front surface of the vehicle and engage its sides which restores. them to their normal vertical attitude.

Conversely, the first pair of vertical brushes may be counterrotated in the opposite sense, i.e., with their confronting sides moving downstream, which causes them to pass rapidly outwardly across the front surface and inwardly across the rear surface of the vehicle upon engaging same.

According to a further feature of my invention, a pair of horizontally swingable ancillary arms are symmetrically fulcrumed on the guide structure at pivot points downstream of the first and preferably also the second transverse plane, the extremities of these ancillary arms supporting a pair of third vertical rotary brushes which are biased toward respective sides of the vehicle for scrubbing same at its wheel level. The main supporting arms carrying the second brush pair and the ancillary arms carrying the third brush pair are provided with coupling means, such as stops on one pair of arms coacting with the arms of the other pair, for holding the ancillary arms in a retracted position substantially parallel to the line of vehicular advance as long as the brushes of the second pair are in their normal position, i.e., prior to their encounter with the oncoming vehicle. In that retracted position, in which the extremities of the ancillary arms point upstream, the brushes of the third pair are held out of the vehicular path by the overriding biasing force of the main supporting arms until the vehicle has moved in between them; they are then released for movement toward the sides of the vehicle by their own biasing forces which may also be provided by spring-loaded or tilted hinges. Advantageously, these third brushes are driven to counterrotate in the same sense as the first brushes, i.e., with their confronting sides moving in the downstream direction, which tends to draw them inwardly toward each other as soon as the vehicle has moved past; as a result, these brushes will sweep across at least part of the rear surface of the vehicle to give it an additional scrubbing at a low level.

BRIEF DESCRIPTION OF THE DRAWING

The above and other features of my invention will now be described in detail with reference to the accompanying drawing in which.

SPECIFIC DESCRIPTION

Figure 1:
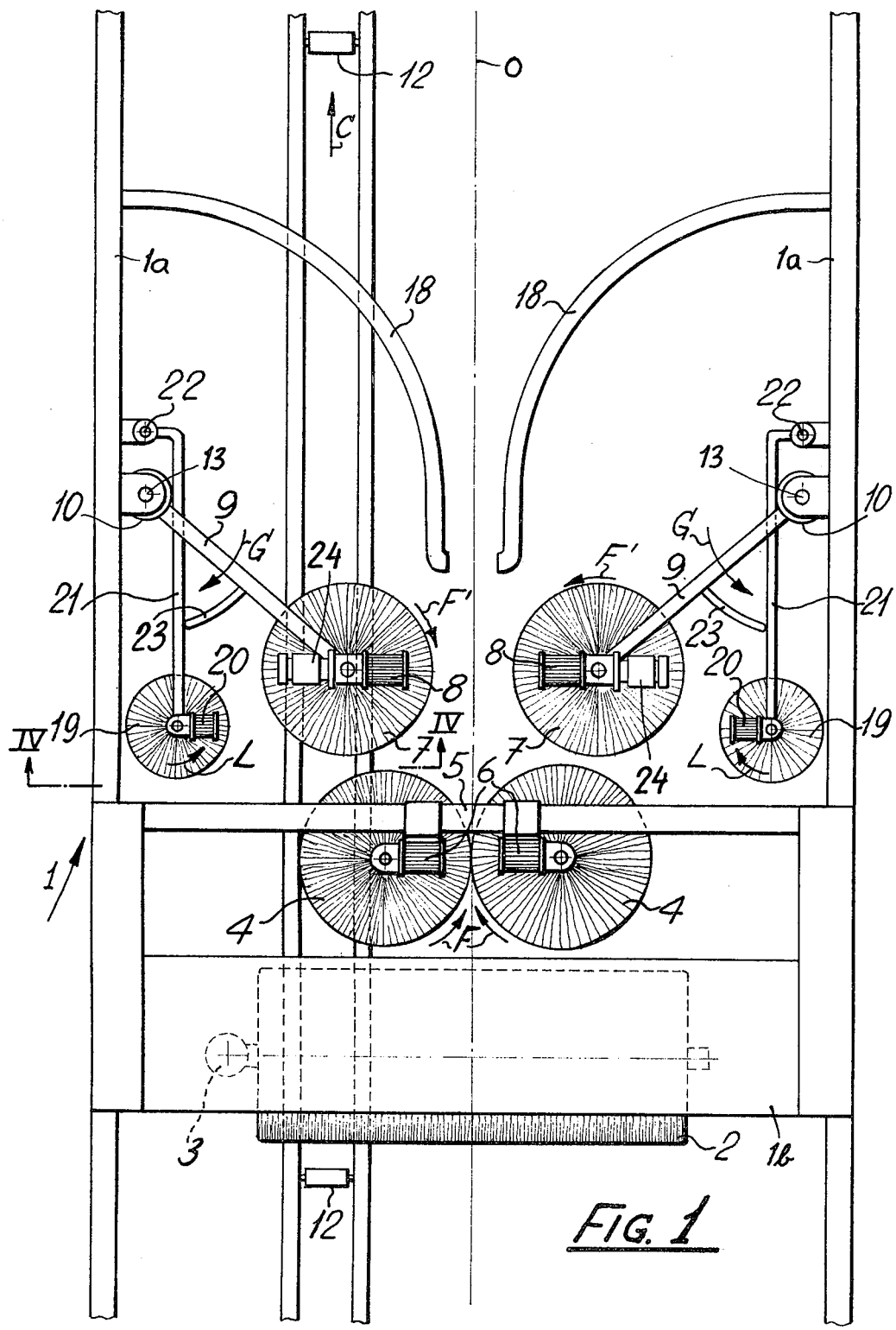
FIG. 1 is a somewhat diagrammatic top plan view of a vehicle-washing station according to the invention, with the brushes thereof shown in their normal position.
Figure 2:
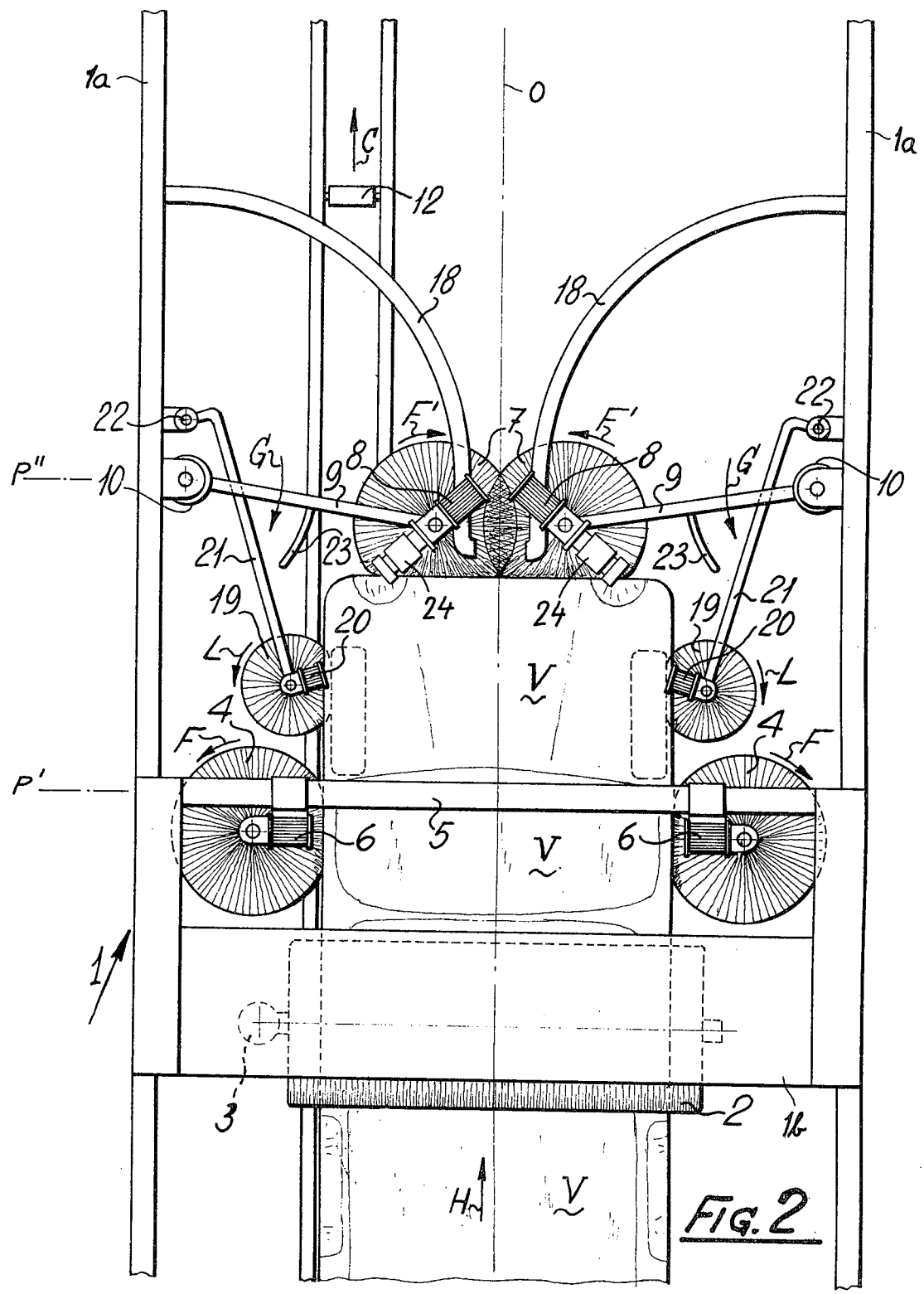
FIG. 2 is a view similar to FIG. 1, showing the brushes displaced by a vehicle in an initial phase of a washing cycle.

The vehicle-washing station shown in the drawing comprises a guide structure 1, here assumed to be stationary, with sidewalls 1a and a portal frame 1b defining a guide path for a vehicle V moving along a straight centerline O in the direction of arrow H, i.e., upwardly in FIGS. 1 - 3 and 6 - 9. The vehicle is entrained, in a conventional manner not further illustrated, by means of a chain 12 moving continuously or intermittently as indicated by an arrow C.

Guide structure 1 supports a number of rotary scrubbing brushes of generally cylindrical configuration, namely a horizontal brush 2, a pair of first vertical brushes 4, a pair of second vertical brushes 7 and a pair of third vertical brushes 19, the latter being of smaller diameter and descending to a lower level than brushes 4 and 7. Horizontal brush 2 is driven by a motor 3 and can be raised and lowered in a manner not further illustrated, e.g., as described in my prior U.S. Pat. No. 3,725,967. Portal frame 1b carries, at the level of its lintel, a transverse rod 5 on which the brushes 4 are mounted for symmetrical oscillation with freedom to tilt in planes perpendicular to the rod 5, the mechanism for their displacement having also been omitted; such a mechanism is shown in my prior U.S. Pat. Nos. 3,618,152 and 3,633,231. Rod 5 generally defines the location of a first transverse plane P' in which the brushes 4 are displaceable. A second transverse plane P'', downstream of plane P', is defined by the pivotal axes 13 of a pair of main supporting arms 9 whose free ends carry the brushes 7; the arms 9 are fulcrumed on sidewalls 1a, above the path of vehicle V, by means of hinges 10 which may be tilted or spring-loaded to bias them in an upstream direction, as indicated by arrows G, into the normal position of FIG. 1. In this normal position, the brushes 7 are swung outwardly, i.e., away from centerline O, and are separated by a distance less than the width of vehicle V and therefore also less than the length of horizontal brush 2.

A pair of ancillary arms 21 are fulcrumed on sidewalls 1a by tilted or spring-loaded hinges 22 defining pivotal points downstream of plane P'', the arms 21 lying also above the vehicular path and intersecting the arms 9. The brushes 19 are suspended from the extremities of ancillary arms 21 which are biased by their own tilted or spring-loaded hinges in a direction opposite that of arrows G, as indicated by an arrow G' in FIG. 6. Arms 9 are provided with depending lugs 23, extending to the level of arms 21, which normally engage the latter to link the initial movement of the brushes 19 with that of the brushes 7. In the quiescent state of FIG. 1, the overriding biasing force of arms 9 holds the arms 21 in a retracted position, substantially parallel to walls 1a, with their brush-supporting extremities pointing upstream, i.e., toward the plane of motion P' of brushes 4. With arms 21 coming to rest against hinges 10, lugs 23 also act as stops to prevent the rearwardly swinging arms 9 (arrows G) from passing the normal position of FIG. 1.

Brushes 4, 7 and 19 are provided with respective motors 6, 8 and 20 counterrotating the brushes of each pair in the directions discussed above, as respectively indicated by arrows F, F' and L. The brushes may rotate continuously or only in the presence of a vehicle.

Figure 3:
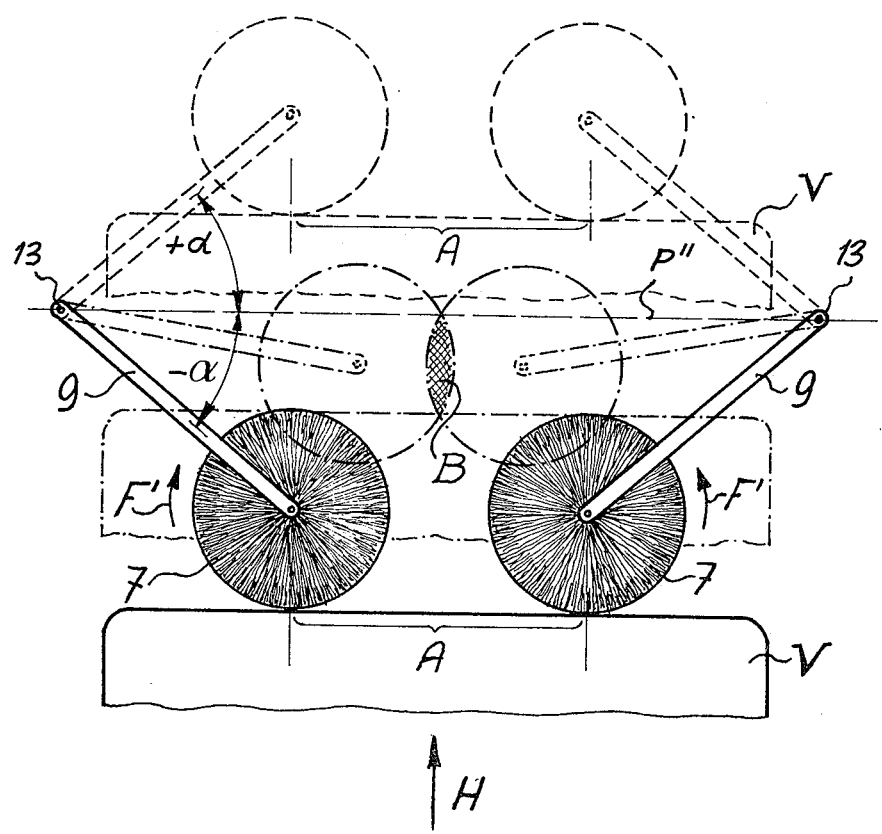
FIG. 3 is a more schematic top view of a pair of brushes of the system of FIGS. 1 and 2 in three different operating positions.
Figure 4:
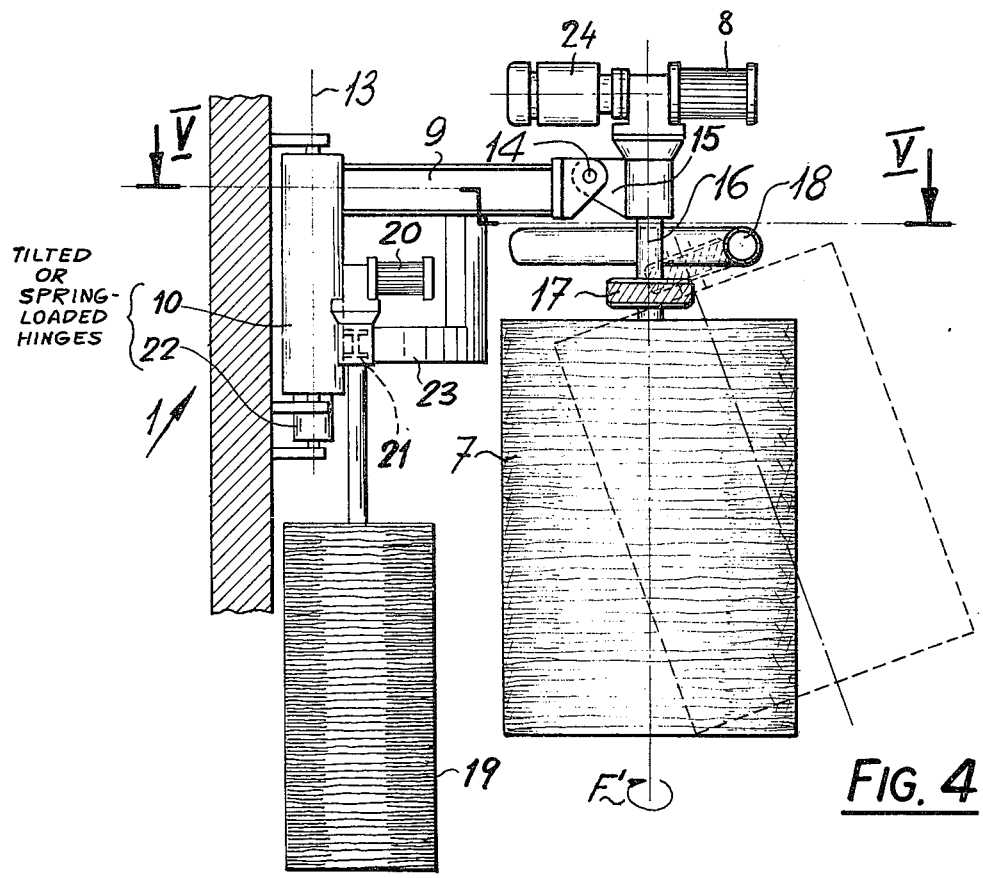
FIG. 4 is a fragmentary elevational view taken on the line IV — IV of FIG. 1 and drawn to a larger scale.
Figure 5:
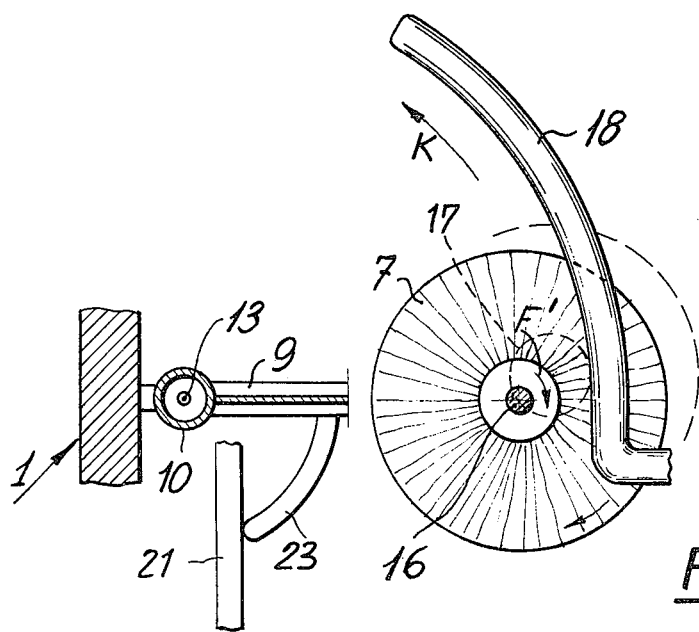
FIG. 5 is a fragmentary top view, partly in section, taken on the line V — V of FIG. 4.

As best seen in FIGS. 4 and 5, each brush 7 has a shaft 16 which is tiltably mounted on its supporting arm 9 by means of a bearing 15 articulated to that arm at 14. The brush can thus be limitedly inclined, as indicated by broken lines in FIGS. 4 and 5, in a direction substantially paralleling the front surface of a vehicle V entering into contact with the brush, i.e., in a plane substantially parallel to planes P' and P'' in the normal position of FIG. 1. Such tilting is induced by the sense of rotation (arrows F' in FIGS. 1 – 3), clockwise in the case of the left-hand brush, which tends to displace the brush toward centerline O. The weight of brush 7 and its motor 8 is balanced by a counterpoise 24 preserving the vertical attitude of the disengaged brush. Each brush shaft 16 fixedly carries a friction roller 17 which, upon a tilting as indicated in FIGS. 4 and 5, comes to bear upon one of two stationary arcuate rails 18 which are centered on the pivotal axes 13 of arms 9 above the vehicular path. The engagement of friction wheels 17 with rails 18 generates a positive driving force which helps propel the brushes 7 forwardly and outwardly, as indicated by an arrow K in FIG. 5, to let the brushes clear the vehicle V in the final phase of their forward swing in which the thrust of the vehicle has only a small component perpendicular to the arms 9. In this way, even minor projections at the front surface of the vehicle will not prevent the withdrawal of the brushes.

FIG. 3 shows three successive positions of brushes 7 during the scrubbing of the front surface of a vehicle V. At first contact, the brushes are slightly moved inwardly from their normal position of FIG. 1 so that their axes are separated by a distance A. The arms 9 now include an angle $-\alpha$ with the plane P''. Upon a forward swing through a somewhat smaller angle, the bristles of brushes 7 being to interpenetrate as shown at B; the concurrent flattening of the brush bodies ensures an effective scrubbing of the midportions of the vehicular front surface as the arms 9 swing through their axial plane P''. Upon a further swing through an angle $+\alpha$ beyond that plane, the brush axes are again spaced apart by the initial distance A.

Figures 6, 8:
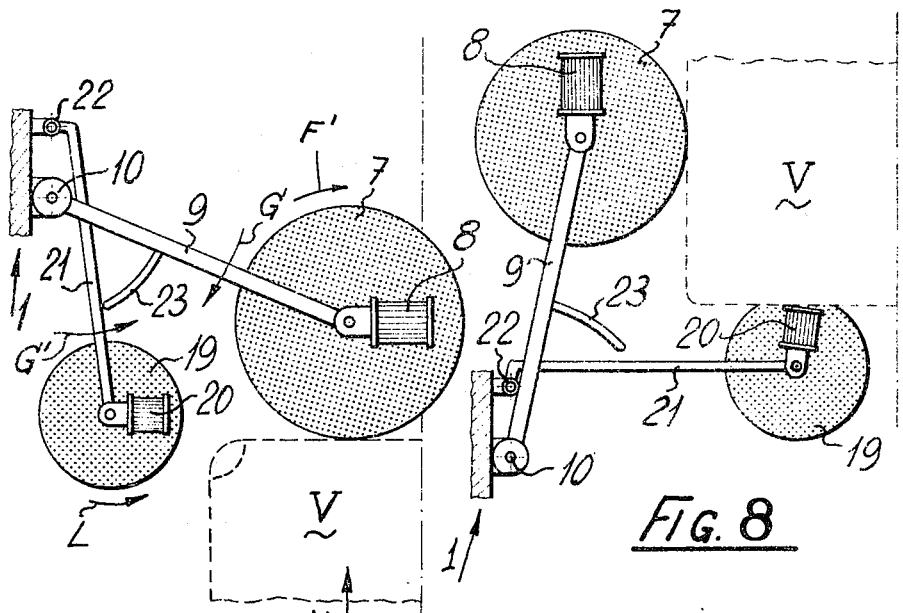
FIGS. 6 – 9 are schematic top views showing the elements of FIGS. 4 and 5 in successive positions during a washing cycle.
Figures 7, 9:
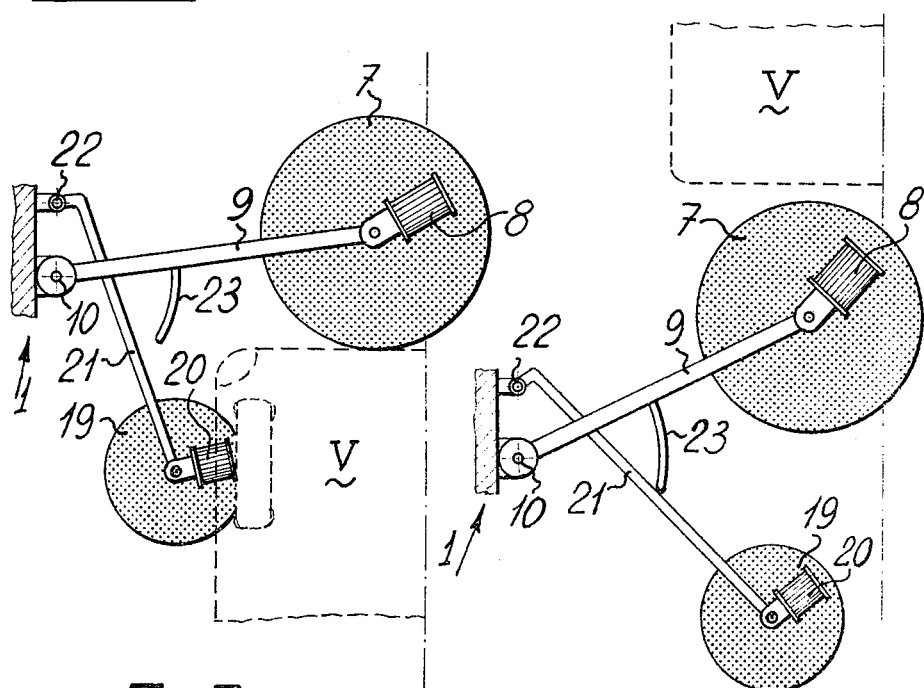

FIGS. 6 – 9 show the correlated motions of brushes 7 and 19 from the instant of initial contact between the vehicle and brush 7 to a time when the rear surface of the vehicle has just left that brush. In FIG. 6 the brush 19 begins it swing toward the side of vehicle V as the brush 7 moves forward. In FIG. 7 the brush 19 has entered the space beneath the front fender and scrubs one of the vehicle wheels even as brush 7 begins to withdraw from the front surface of the vehicle. In FIG. 8, the brush 7 has swept most of the side of the vehicle while brush 19, having cleared its rear edge, moves inwardly along the rear surface thereof. In FIG. 9, the vehicle has disengaged itself from the brush 7 whose lug 23 thereupon begins to retract the brush 19 as the two arms are returned by the biasing force of hinge mounting 10 to the normal position of FIG. 1.

It will thus be seen that the wheel-scrubbing brushes 19 and their swing arms 21 are entirely accommodated within the part of structure 1 which carries the main arms 9 and the guide rails 18 so that no additional space is required for these brushes.

I claim:

1. A scrubbing apparatus for a vehicle-washing station, comprising:
   a guide structure straddling a path for a wheeled vehicle movable relatively thereto along a straight line;
   horizontal rotary brush means mounted on said structure above said path for up-and-down movement to scrub front, top and rear surfaces of said vehicle;
   a pair of first vertical rotary brushes symmetrically mounted on said structure for oscillatory movement in a first transverse plane perpendicular to said line to scrub front, side and rear surfaces of respective halves of said vehicle;
   a pair of horizontally swingable supporting arms symmetrically fulcrumed on said structure above said path with pivotal axes located in a second transverse plane perpendicular to said line downstream of said first transverse plane with reference to the apparent vehicular motion and with free ends extending inwardly from said pivotal axes toward the centerline of said path;
   a pair of second vertical rotary brushes suspended from said free ends for supplementing the scrubbing action of said first vertical brushes; and
   biasing means urging said supporting arms into a normal position in which said second vertical brushes lie upstream of said second transverse plane and are separated from each other by a distance less than the width of said horizontal brush means, said biasing means being sufficiently yieldable to enable said second vertical brushes to move under the thrust of the oncoming vehicle past said second transverse plane into an alternate position in which they are again separated after closely approaching each other in an intermediate position coinciding with said second transverse plane.

2. An apparatus as defined in claim 1, wherein said second vertical brushes are provided with drive means for counterrotating same with their confronting sides moving upstream, said second vertical brushes having shafts tiltably mounted on said free ends with swing axes extending generally parallel to said line in said normal position.

3. An apparatus as defined in claim 2, further comprising two arcuate tracks fixed to said structure above said path and centered on said pivotal axes, respectively, each of said shafts being provided with a friction roller engageable with the respective track upon a tilting of the shafts toward each other, said friction rollers coacting with said tracks to complete the swing.

4. An apparatus as defined in claim 2 wherein said first vertical brushes are provided with drive means for counter-rotating same with their confronting sides moving downstream.

5. An apparatus as defined in claim 1, further comprising a pair of horizontally swingable ancillary arms symmetrically fulcrumed on said structure at pivot points downstream of said first transverse plane, a pair of third vertical rotary brushes suspended from extremities of said ancillary arms remote from said points, and coupling means between said supporting arms and said ancillary arms for holding said third vertical brushes out of the path of said vehicle until said second vertical brushes have been displaced by the vehicle from said normal position, said third vertical brushes being inwardly biased toward respective sides of the vehicle for scrubbing same at the wheel level thereof.

6. An apparatus as defined in claim 5 wherein said coupling means comprise stops on one of said pairs of arms with the arms of the other pair for holding said ancillary arms against their biasing forces in a position substantially parallel to said line, with said extremities pointing upstream, in said normal position of said second vertical brushes.

7. An apparatus as defined in claim 7 wherein said pivot points are located downstream of said second transverse plane, said supporting and ancillary arms intersecting each other.

8. An apparatus as defined in claim 7 wherein said biasing means comprises a first pair of hinge mountings for said supporting arms, said ancillary arms being provided with a second pair of hinge mountings exerting thereon a biasing force less than that exerted by said first pair of hinge mountings.

9. An apparatus as defined in claim 5 wherein said third vertical brushes are provided with drive means for counter-rotating same with their confronting sides moving downstream.

10. An apparatus as defined in claim 1 wherein said supporting arms are of such length that the bristles of said second pair of vertical brushes interpenetrate in said position of closest approach.

* * * * *